United States Patent [19]
Carrington

[11] 4,068,118
[45] Jan. 10, 1978

[54] ILLUMINATED OPTICAL FIBER DISPLAY SYSTEM

[76] Inventor: Lewis R. Carrington, 40 Walnut St., Berrien Springs, Mich. 49103

[21] Appl. No.: 727,892

[22] Filed: Sept. 29, 1976

[51] Int. Cl.² .............................................. A47G 33/16
[52] U.S. Cl. .................................... 362/123; 40/547; 362/32
[58] Field of Search ................ 240/1 EL, 10 T, 1 LP; 40/130 K, 132 E, 126 B

[56] References Cited

U.S. PATENT DOCUMENTS

| | | | |
|---|---|---|---|
| 569,764 | 10/1896 | Nason | 40/132 E X |
| 1,921,614 | 8/1933 | Frei | 240/1 EL X |
| 2,121,460 | 6/1938 | Waters | 240/10 T |
| 2,125,906 | 8/1938 | Frei | 240/1 EL X |
| 2,227,861 | 1/1941 | Petrone | 240/1 EL X |
| 2,507,909 | 5/1950 | Kaysen | 40/130 K |
| 3,641,335 | 2/1972 | Wall | 240/10 T |

Primary Examiner—Russell R. Kinsey
Assistant Examiner—Wenceslao J. Contreras
Attorney, Agent, or Firm—Marmaduke A. Hobbs

[57] ABSTRACT

An illuminated optical fiber display system for Christmas trees, ornamental displays and signs and the like, in which an elongated column having a hollow interior contains a fluorescent light tube and the column supports a plurality of optical fiber elements enclosed in a sheath extending outwardly from the column and having the inner ends in a position to receive light from the fluorescent light tube in the column. The optical fiber elements may be decorated to resemble evergreen branches. The fluorescent light or a sleeve around the fluorescent light, containing colored and shaded areas, is rotated to vary the lighting characteristics emitted from the outer ends of the optical fiber elements. The concept involved in the present application has sufficient versatility that the sleeve and/or fluorescent light and the shading and coloring thereon may be varied to provide the ornamental characteristics desired.

10 Claims, 6 Drawing Figures

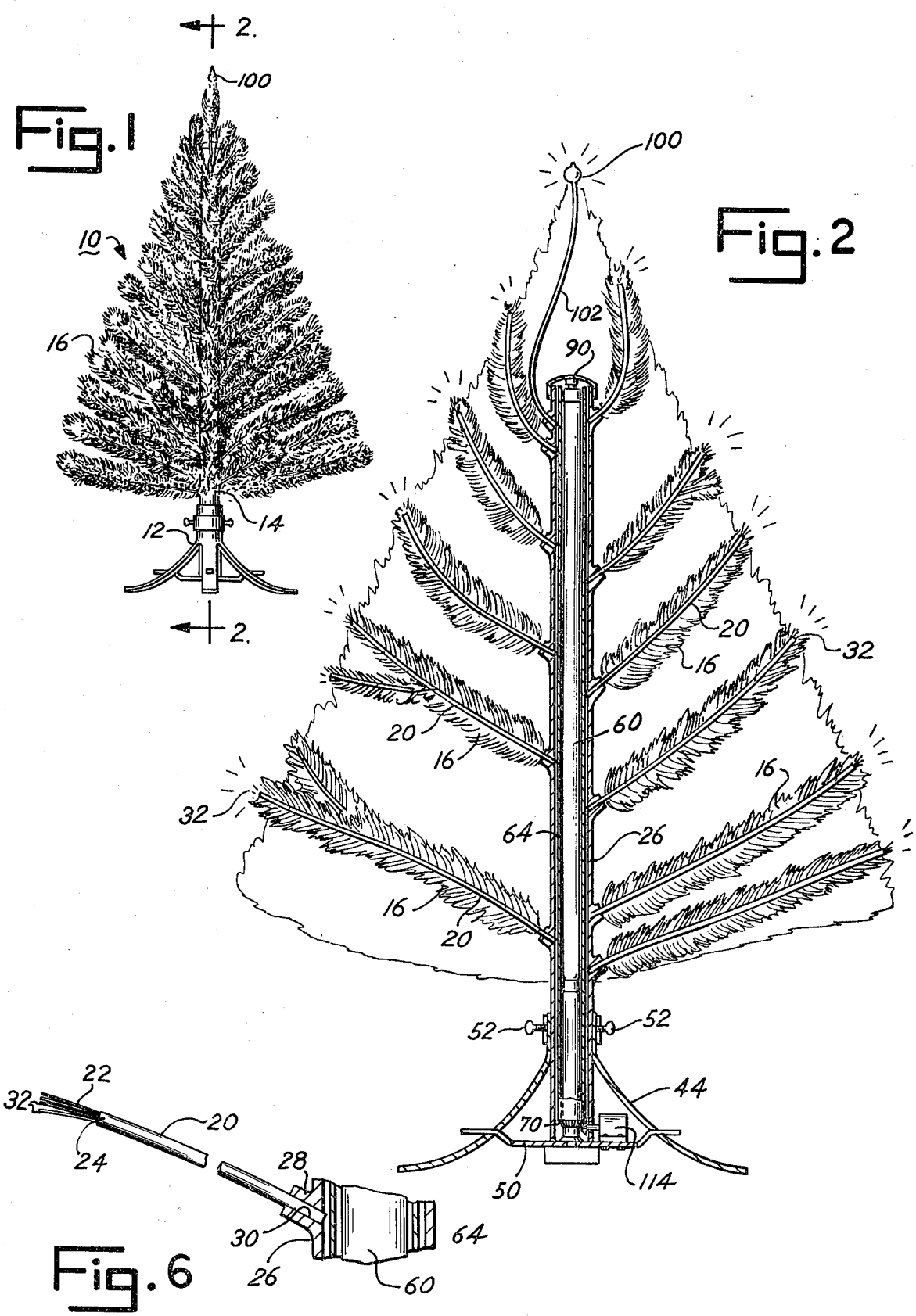

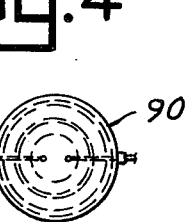
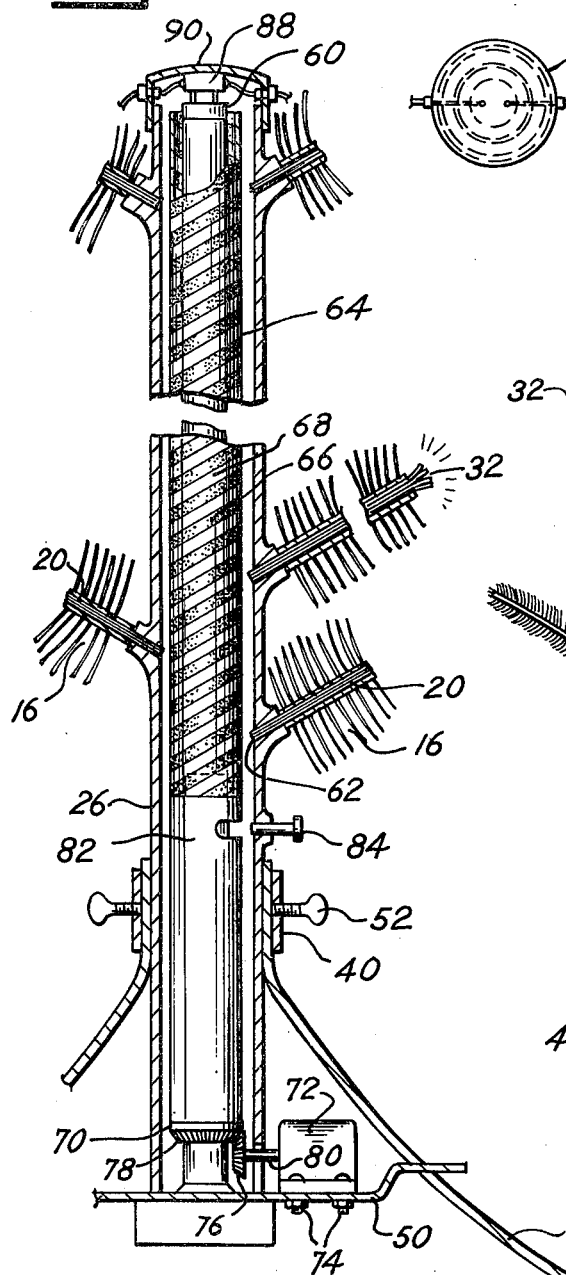
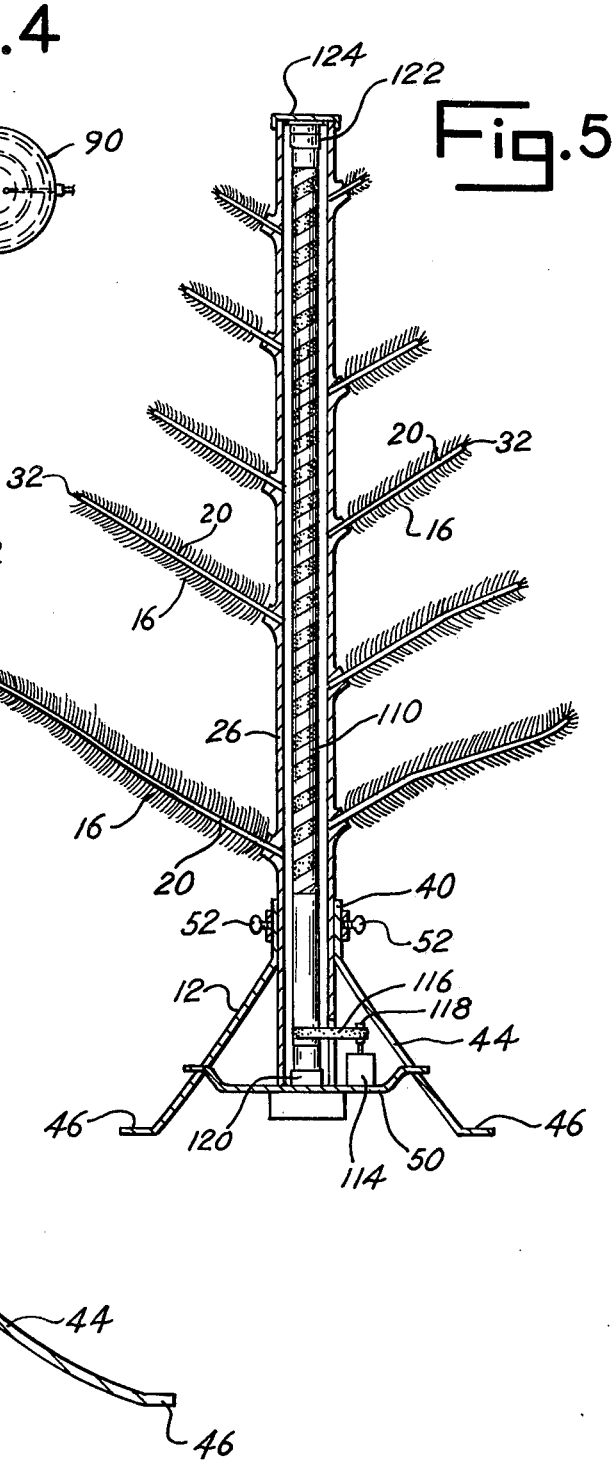

ILLUMINATED OPTICAL FIBER DISPLAY SYSTEM

It is common practice in the ornamental decoration field to use optical fibers which transmit light from one end to the other. These fibers are usually bundled together in a tubular sheath with the fibers at one end being exposed to a light and at the other end being clustered or flared outwardly, forming a spray or bouquet of lights. The light for the fibers has generally been a holder having an incandescent light bulb and shaped internally to concentrate light from the bulb onto the bundled fiber ends. The holders are usually designed with decorated exteriors to provide attractive appearance for the lighted fiber assemblies. However, the holders are relatively large and bulky and normally require individual lights for each spray or bundle, and the cost of the illumination source and holder, as well as its bulkiness, prevent the widespread acceptance of optical fiber sprays for decoration, particularly where a relatively large number of individual sprays are required, such as for example, in the decoration of Christmas trees or the like. While attempts have been made to illuminate fiber sprays and the like without requiring bulky and expensive light source holders, these holders and the systems in which they are used have lacked varsatility, with wide variations in lighting arrangements, displays and performance characteristics. It is therefore one of the principal objects of the present invention to provide an artificial Christmas tree lighting system which utilizes optical fibers for transmitting light from a source in or around the trunk of the tree, and in which the light transmitted from the light source to the free ends of the fibers is varied during operation in color, intensity and/or duration.

Another object of the invention is to provide Christmas trees, ornamental displays, signs and the like having a mechanism for lighting optical fibers, which can be varied or modified to give a number of different lighting effects in any one arrangement, and which can be readily changed from time to time to provide a desired arrangement of and changing lighting patterns to a plurality of clusters of fiber ends.

Still another object of the invention is to provide ornamental displays, such as Christmas trees, of the aforementioned type which are simple in construction and operation, and which can be used satisfactorily for home or commercial displays in various sizes and shapes and in combination with other ornamental devices and systems.

A further object is to provide an illuminated ornamental display system which is versatile and readily adaptable to different uses and arrangements, and which can easily be fabricated using standard production equipment, shipped and readily assembled by the ultimate customer without any special skill or training.

Additional objects and advantages of the invention will become apparent from the following description and accompanying drawings, wherein:

FIG. 1 is an elevational view of a Christmas tree having the present illuminated display system embodied therein;

FIG. 2 is a vertical cross sectional view of the Christmas tree shown in FIG. 1, the section being taken on line 2 — 2 of the latter figure;

FIG. 3 is an enlarged fragmentary cross sectional view similar to that shown in FIG. 2;

FIG. 4 is a horizontal top plan view of the trunk of the tree as shown in FIG. 3;

FIG. 5 is a vertical cross sectional view similar to that shown in FIG. 2, illustrating a modified form of the invention; and FIG. 6 is an enlarged fragmentary partial cross sectional view of a portion of the optical fiber display system used in the embodiments illustrated in the preceding figures.

Referring more specifically to the drawings, and to FIG. 1 in particular, numeral 10 indicates generally an artificial Christmas tree having a stand 12, a trunk 14 supported by the stand, and numerous branches 16 connected to and supported by trunk 14. While a Christmas tree is used herein for the purpose of illustrating the present invention, the illuminated optical fiber display system is applicable to other types of displays, including other ornamental displays and commercial signs. However, the invention is particularly adapted to illuminated artificial Christmas trees, and the description will be directed primarily to that application of the invention.

Each of the branches 16 consists of a tubular element 20 of optical fibers 22 enclosed in an opaque plastic sheath 24. The inner end of the tubular element 20 is attached to and supported by tubular column 26 forming the external member of trunk 14, the column 26 preferably being of metal or rigid opaque plastic which is capable of firmly supporting the branches in the position illustrated. A boss 28 may be provided around hole 30 through which the inner end of tube 20 extends. The sheath 24 terminates inwardly from the outer end of the fibers, thus permitting the outer end of the fibers to be exposed and to separate from one another and spread into a spray type structure so that the light projected through the fibers of element 20 will appear to be a cluster of small, individual lights at the ends 32 of the fibers.

Column 26 of trunk 14 is seated in a collar 40 of stand 12, and the collar is supported by a plurality of legs 44 joined rigidly to collar 40 and extending laterally downwardly and outwardly and terminating in feet 46 which seat firmly on a floor or other supporting surface. A platform 50, connected to and disposed between the legs, also supports tubular column 26, the lower end of which is preferably rigidly secured to the platform by brackets or any other suitable means for rigidly attaching the column to the platform. However, the lower end of the column may be seated in a recess over a flange and be removable by merely loosening the thumb screws 52 extending through collar 40 and engaging column 26 to hold the column firmly in an upright position. Each element 20 may contain as many as 25 to 50 fibers, each of which produces a light at the outer end 32.

In the embodiment of the invention illustrated in FIGS. 2, 3 and 4, the branches are illuminated by a fluorescent light tube 60 disposed in the hollow interior of column 26 and spaced from the walls thereof. The fluorescent tube emits light, which illuminates the inner ends 62 of the fibers of the branches, and this light is transmitted through the fibers of elements 20 to the outer ends as previously described herein. While the fluorescent light provides a satisfactory illuminating source for the fibers, without more, the fiber ends would give off a constant, uniform light. With the present invention, a movable, preferably rotating, sleeve 64 is disposed around the fluorescent light tube 60 and, in the embodiment illustrated, contains a helical band 66 of opaque or colored translucent material which, when the tube is rotated, constantly changes the character of the light directed on the inner ends of the fibers. The spaces 68 between bands 66 normally, but not necessarily, are clear so that the light changes from a natural fluorescent light emission to a colored light or to no light momentarily and intermittently. The intermediate spaces or bands 68 may be colored to emit different colored light than band 66. These spiral bands may be closely spaced or spaced a substantial distance apart, which will result in different characteristics in the emission of light at the ends of the optical fibers. Different configurations may be used on the sleeve 64, such as for example, vertical stripes, a series of dots, and criss-cross configurations, of various colors and opaque shading. Further, one configuration can be used on one part and another configuration part on another part, so that different effects can be obtained at various levels on the tree or other type of display in which the system is used.

The sleeve 64, which is preferably of plastic material in a cylindrical form, is supported on a collar and bearing 70 at the bottom, and may be supported at the top by a bearing; however, sufficient support may be provided at the bottom that no support would be required at the top. The outer ring of the bearing 70 on which the sleeve is mounted is driven by a combination electric motor and gear reducer 72 mounted on platform 50 by a plurality of bolts 74. The sleeve is rotated by beveled gears 76 and 78, gear 76 being mounted on motor shaft 80 and beveled gear 78 being mounted and rigidly secured to the outer ring of the bearing on which the lower end of sleeve 64 is supported. Various other types of supports and drives for sleeve 64 may be used in different makes or models of a Christmas tree of the present type. The sleeve may be continuous from top to bottom, or it may have light emitting sections indicated throughout the portion where the helical bands are located and fully opaque portions at various intervals throughout. In this embodiment, the upper portion may be locked to the lower portion 82 by a pin 84 slidable through column 26. The variety of masked or colored bands on the movable sleeve is virtually unlimited and may be multi-color, such as red and green or red, white and blue or any other combination with or without normal light and totally dark masked areas. The sleeve may be either rotated or moved vertically up and down, or a combination of these motions.

The fluorescent tube 60 is inserted in a conventional fluorescent lighting fixture, with one contact at the bottom (not shown) and another contact 88 disposed in the upper end of column 26 beneath cap 90. After the branches have been assembled in the manner indicated and the fluorescent light and the motor 72 started, the light emitted from the fluorescent tube passes through sleeve 64 and impinges on the ends of the fibers in the various branches, producing a light at the outer ends 32 of the fibers. The rotating tube constantly produces a variation in the characteristic of the light emitted at the fiber ends, the lights changing in character depending upon the configuration or masking and color lines on rotatable sleeve 64. The present illuminating system may be combined with a conventional incandescent lighting system, such a combination being illustrated by the light 100 at the top of the tree, with the light being connected to suitable wiring in the column 26 by a lead wire 102. Various other such lights may be used in combination with this system if desired, and in some installations, an incandescent light may be used in place of a fluorescent light.

In the operation of the Christmas tree which illustrates the illuminated optical fiber display system of the present invention, normally the tree would be shipped in an unassembled condition, with the branches disassembled from column 26 and the base detached from the trunk column. In assembling the tree, the column is inserted in the base and the thumb screws 52 tightened to hold the column rigidly in an upright position on the base. When the column is inserted in place, the two gears 76 and 78 mesh with one another. The branches are then inserted in holes 30, normally to construct a tree of the shape illustrated in FIG. 1, with the longer branches at the bottom and the branches decreasing in length to the top of the tree. The rotating sleeve 64, the fluorescent tube 60, and column 26 are preferably permanently assembled as a single unit which can be mounted in the base in the manner described above.

In a modified form of the invention illustrated in FIG. 5, which may be considered a simplified form of the present invention, the column, stand and branches are essentially the same as that described with reference to the embodiment shown in FIGS. 2, 3 and 4, and hence like numerals are being used to refer to the like parts where applicable. However, instead of utilizing a rotatable sleeve 64, a rotatable fluorescent tube 110 is used, having the color configurations and masked areas on the surface of the fluorescent tube, thus eliminating the need for a separate rotatable sleeve 64. The tube is driven by a motor and gear reducer 114 through a belt and sheaves 116 and 118. Rotatable electric connectors or swivels 120 and 122 are utilized at the bottom and top of tube 110 to provide an electrical connection for the fluorescent light tube. The connectors for the fluorescent tube are considered conventional for the purpose of the present invention and will not be described in detail herein. As the tube 110 rotates, the configuration on the tube produces a variation in the effect of the lighting transmitted through the fibers to the outer ends of the branches. The assembled tree of FIG. 5 may have the same outer appearance as that shown in FIG. 1, if desired, or may be of any other configuration, with the same versatility as the embodiment illustrated in FIGS. 2, 3 and 4. The design on the surface of the fluorescent tube may be changed in any manner to obtain the desired effect as described with reference to rotatable sleeve 64.

While only two embodiments of the present illuminated optical fiber display system have been described in detail herein, various changes and modifications may be made without departing from the scope of the invention.

I claim:

1. An illuminated optical fiber display system comprising a column having an external wall defining an elongated hollow interior, optical fiber elements each including a plurality of fibers enclosed in a sheath having an inner end extending into said wall and being supported thereby, an elongated illumination means disposed in the hollow interior of said column and having a movable translucent member through which light passes to the inner ends of said elements, said illumination means including a fluorescent light tube extending lengthwise of said hollow interior, and power means for moving said translucent member for varying the lighting characteristics emitted from the outer ends of the fibers of said elements.

2. An illuminated optical fiber display system as defined in claim 1 in which said movable translucent member is a sleeve disposed around said fluorescent light tube.

3. An illuminated optical fiber display system as defined in claim 1 in which said movable translucent member contains a shaded color area for varying the lighting characteristics transmitted to the inner ends of said elements.

4. An illuminated optical fiber display system as defined in claim 3 in which said power means includes a drive for rotating said sleeve relative to said fluorescent light tube.

5. An illuminated optical fiber display system as defined in claim 4 in which said column is cylindrical in shape and of opaque material, and the inner ends of said fiber elements extend through said wall and have the form simulating the branches of a tree.

6. An illuminated optical fiber display system as defined in claim 1 in which said movable translucent member consists of the outer wall of said fluorescent light tube, and said power means moves said fluorescent tube.

7. An illuminated optical fiber display system as defined in claim 6 in which said power means for moving said translucent member rotates said fluorescent light tube.

8. An illuminated optical fiber display system as defined in claim 7 in which said column is cylindrical in shape and of opaque material, and the inner ends of said fiber elements extend through said wall and have the form simulating the branches of a tree.

9. An illuminated optical fiber display system as defined in claim 8 in which the surface of said fluorescent light tube contains various areas of different colors and shades.

10. An illuminated optical fiber display system as defined in claim 1 in which a stand is provided for holding said column in a vertical position, and said illumination means includes a generally cylindrical elongated, rotatable translucent member having surface areas of different colors and shades for varying the lighting characteristics emitted from the outer ends of the fibers of said element, and in which said power means rotates said cylindrical member and a stand retains said column in a vertical position.

* * * * *